United States Patent

Um et al.

(10) Patent No.: US 10,439,189 B2
(45) Date of Patent: Oct. 8, 2019

(54) SEPARATOR FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Sujin Um, Yongin-si (KR); Jung Woo An, Yongin-si (KR); Jungyeon Won, Yongin-si (KR); Jungwook Cha, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 12 days.

(21) Appl. No.: 15/707,330

(22) Filed: Sep. 18, 2017

(65) Prior Publication Data

US 2018/0083248 A1   Mar. 22, 2018

(30) Foreign Application Priority Data

Sep. 19, 2016   (KR) ........................ 10-2016-0119179

(51) Int. Cl.
*H01M 2/16*  (2006.01)
*H01M 10/052* (2010.01)
*H01M 10/42* (2006.01)
*H01M 10/0583* (2010.01)

(52) U.S. Cl.
CPC ......... *H01M 2/1686* (2013.01); *H01M 2/166* (2013.01); *H01M 10/052* (2013.01); *H01M 10/4235* (2013.01); *H01M 10/0583* (2013.01)

(58) Field of Classification Search
CPC ........... H01M 2/1686; H01M 10/4235; H01M 2/166; H01M 10/052
See application file for complete search history.

(56) References Cited

U.S. PATENT DOCUMENTS

| 9,029,003 B2 | 5/2015 | Sulaiman et al. | |
| 2011/0236710 A1* | 9/2011 | Lee | C09D 5/24 428/553 |
| 2012/0115009 A1* | 5/2012 | Okuno | H01M 2/1646 429/145 |
| 2013/0244082 A1* | 9/2013 | Lee | H01M 2/1646 429/145 |

FOREIGN PATENT DOCUMENTS

| JP | 2012-104291 A | 5/2012 |
| KR | 10-2008-0017110 A | 2/2008 |
| KR | 10-2010-0035221 A | 4/2010 |
| KR | 10-2011-0041448 A | 4/2011 |

\* cited by examiner

*Primary Examiner* — Stewart A Fraser
(74) *Attorney, Agent, or Firm* — Lee & Morse, P.C.

(57) ABSTRACT

A separator for a rechargeable lithium battery includes a polymer substrate, and a coating layer on at least one surface of the polymer substrate. The coating layer includes a ceramic, a binder, and a nanoclay having an interlayer spacing (d-spacing) of about 10 Å to about 50 Å.

11 Claims, 2 Drawing Sheets

SEPARATOR FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2016-0119179, filed on Sep. 19, 2016, in the Korean Intellectual Property Office, and entitled: "Separator For Rechargeable Lithium Battery And Rechargeable Lithium Battery Including Same," is incorporated by reference herein in its entirety.

BACKGROUND

1. Field

Embodiments relate to a separator for a rechargeable lithium battery and a rechargeable lithium battery including the same.

2. Description of the Related Art

Recently, as a market share for a mid-and large-sized rechargeable lithium battery has grown, development of a safe rechargeable lithium battery having no danger of explosion and ignition and having a high-capacity and a long cycle-life has become desirable.

SUMMARY

Embodiments are directed to a separator for a rechargeable lithium battery including a polymer substrate, and a coating layer on at least one surface of the polymer substrate. The coating layer includes a ceramic, a binder, and a nanoclay having an interlayer spacing (d-spacing) of about 10 Å to about 50 Å.

The nanoclay may be present in a form of an exfoliated layered shape in the coating layer.

A content of the nanoclay may be about 0.2 wt % to about 5 wt % based on 100 wt % of the coating layer.

A mixing ratio of the ceramic and the binder may be about a 99:1 weight ratio to about a 90:10 weight ratio.

A weight average molecular weight of the binder may be 600,000 to about 1,200,000.

The nanoclay may be pyrophylite-talc, montmorillonite (MMT), montmorillonite modified with a tetravalent ammonium salt, fluorinehectorite, kaolinite, vermiculite, illite, mica, brittle mica, or a combination thereof.

The ceramic may be $Al_2O_3$, CaO, MgO, $TiO_2$, $ZnO_2$, $SiO_2$, $Al(OH)_3$, $Mg(OH)_2$, $Ti(OH)_4$, $Si(OH)_4$, or a combination thereof.

The coating layer may further include a conductive material.

The conductive material may be Denka black, Ketjen black, Super P, or a combination thereof.

A content of the conductive material may be about 0.1 parts by weight to about 5 parts by weight based on 100 parts by weight of the coating layer.

Embodiments are also directed to a rechargeable lithium battery including a positive electrode, a negative electrode, an electrolyte, and a separator as described above between the positive electrode and the negative electrode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
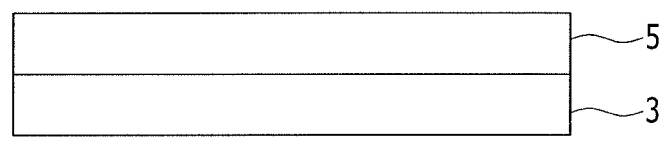
FIG. 1 illustrate a schematic view showing a structure of a separator for a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration.

According to an embodiment, a separator for a rechargeable lithium battery includes a polymer substrate and a coating layer disposed on at least one surface of the polymer substrate. The coating layer may include a ceramic, a binder, and a nanoclay having an interlayer spacing (d-spacing) of about 10 Å to about 50 Å. Such a separator 1 includes a polymer substrate 5 and a coating layer 3 as shown in FIG. 1.

The nanoclay may be present in an exfoliated layered structure in the coating layer. Clay may have a multi-layered structure in which a plurality of layers is stacked. Accordingly, the exfoliated layered structure may be formed when the ceramic and the binder are inserted into clay layers. The ceramic and the binder may separate the clay layers and may be diffused thereinto during a mixing process included in a process of preparing the coating layer composition including the ceramic, the binder, and the nanoclay. In this way, the ceramic and the binder may be inserted into the clay layers and thus may reduce a crystalline region and deteriorate crystallinity of a polymer and resultantly, improve mechanical properties.

The interlayer spacing that is, d-spacing of the nanoclay may be about 10 Å to about 50 Å, or, for example about 20 Å to about 40 Å. When the interlayer spacing of the nanoclay is within the ranges, heat resistance and mechanical strength of a separator may be much improved. The interlayer spacing may be obtained by an X-ray diffraction measurement method using a CuKα ray.

A content of the nanoclay may be about 0.2 wt % to about 5 wt %, or, for example about 0.2 wt % to about 1 wt %, or, for example, about 0.5 wt % to about 1 wt % based on 100 wt % of the coating layer, that is 100 wt %, the total weight of the ceramic, the binder, and the nanoclay. When the content of the nanoclay is within the ranges, mechanical strength and heat resistance of the separator may be further improved.

An average particle diameter (D50) of the nanoclay may be about 1 μm to about 15 μm. When the average particle diameter (D50) of the nanoclay is within the range, desirable exfoliated layered structures may be obtained, and a use effect of the nanoclay may be effectively realized. As used herein, when a definition is not otherwise provided, the term "average particle diameter (D50)" indicates a particle diameter where an accumulated volume is about 50 volume % in a particle distribution.

In the coating layer, a mixing ratio of the ceramic and the binder may be a weight ratio of about 99:1 to 90:10. When the mixing ratio of the ceramic and the binder is within the ranges, mechanical strength and heat resistance of the separator may be further improved.

The nanoclay may be pyrophylite-talc, montmorillonite (MMT), montmorillonite modified with a tetravalent ammonium salt, fluorohectorite, kaolinite, vermiculite, illite, mica, brittle mica, or a combination thereof.

The ceramic may be $Al_2O_3$, CaO, MgO, $TiO_2$, $ZnO_2$, $SiO_2$, $Al(OH)_3$, $Mg(OH)_2$, $Ti(OH)_4$, $Si(OH)_4$, or a combination thereof.

A weight average molecular weight of the binder may be about 600,000 to about 1,200,000. When the weight average molecular weight of the binder is within the range, the nanoclay may be easily dispersed, that is, easily exfoliated, and thus may greatly improve the mechanical strength of a separator.

The binder may be, for example, polyvinylidene fluoride, polyvinyl alcohol, polyvinylchloride, polyvinylfluoride, polyvinylpyrrolidone, polyurethane, polytetrafluoroethylene, polyethylene, polypropylene, or a combination thereof.

The coating layer may further include a conductive material. The conductive material may be Denka black, Ketjen black, Super P, or a combination thereof.

A content of the conductive material may be about 0.1 parts by weight to about 5 parts by weight based on 100 parts by weight of the coating layer. When the conductive material is included within the content range, an effect of using the conductive material may be appropriately obtained.

A thickness of the coating layer may range from about 1 μm to 100 μm. When the thickness of the coating layer is within the range, a separator may secure thermal/mechanical stability that is greater than or equal to a predetermined level. The separator may exhibit a low shrinkage ratio at a high temperature, and may prevent electrodes from being torn apart or broken during a process of manufacturing a battery and particularly, during a process of winding an electrode. The separator may suppress an internal shut-down of the battery.

The polymer substrate may be a polyolefin substrate, and the polyolefin may be a polyethylene-based resin, a polypropylene-based resin, or a combination thereof. Examples thereof include a polyethylene-based resin such as low density polyethylene, linear polyethylene (ethylene-α-olefin copolymer), high density polyethylene, or the like, or a polypropylene-based resin such as polypropylene, an ethylene-propylene copolymer, or the like.

A thickness of the polymer substrate may range from about 8 μm to about 20 μm, or, for example about 10 μm to about 15 μm. When the thickness of the polymer substrate is within the range, a shut-down function effect may be appropriately obtained.

According to an embodiment, a separator may be manufactured by mixing ceramic, a binder, and nanoclay having interlayer spacing (d-spacing) of 10 Å to 50 Å in a solvent to prepare a coating layer composition and coating the coating layer composition onto a polymer substrate. The solvent may be an organic solvent such as N-methyl pyrrolidone, acetone, or the like, or an aqueous solvent such as water or the like.

An embodiment provides a rechargeable lithium battery including a positive electrode, a negative electrode, electrolyte and a separator interposed between the positive and negative electrodes.

The positive electrode may include a positive active material layer including a positive active material and a current collector supporting the positive active material layer.

The positive active material may include lithiated intercalation compounds that reversibly intercalate and deintercalate lithium ions. For example, one or more composite oxides of a metal selected from cobalt, manganese, nickel, and a combination thereof, and lithium may be used. For example, the compounds represented by one of the following chemical formulae may be used. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0≤b≤0.5, 0≤c≤0.05); $Li_aE_{2-b}X_bO_{4-c}D_c$ (0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0<b≤0.5, 0<c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $Li_aFePO_4$ (0.90≤a≤1.8).

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by a method having no adverse influence on properties of a positive active material by using these elements in the compound. For example, the method may include a suitable coating method such as spray coating, dipping, and the like, but is not illustrated in more detail since it is well-known in the related field.

The positive active material layer may further include a binder and a conductive material.

The binder may improve binding properties of positive active material particles with one another and with a current collector. Examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene butadiene rubber, an acrylated styrene-butadiene rubber, an epoxy resin, nylon, or the like.

The conductive material may be included to provide electrode conductivity. A suitable electrically conductive material that does not cause a chemical change may be used as the conductive material. Examples of the conductive material include a carbon-based material such as natural graphite, artificial graphite, carbon black, acetylene black, ketjen black, a carbon fiber or the like; a metal-based material of a metal powder or a metal fiber including copper, nickel, aluminum, silver, or the like; a conductive polymer such as a polyphenylene derivative; or a mixture thereof.

The current collector may use an Al foil, as an example.

The negative electrode may include a current collector and a negative active material layer formed on the current collector. The negative electrode may include a negative active material.

The negative active material may include a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions may include a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, or the like.

Examples of the lithium metal alloy may include lithium and an element selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, a Si—C composite, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, provided that Q is not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, provided that R is not Sn), or the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may include vanadium oxide, lithium vanadium oxide, or lithium titanium oxide.

In the negative active material layer, the negative active material may be included in an amount of about 95 wt % to about 99 wt % based on the total weight of the negative active material layer.

The negative active material layer may include a binder, and optionally, a conductive material. In the negative active material layer, a content of the binder may be about 1 wt % to about 5 wt % based on the total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder may improve binding properties of negative active material particles with one another and with a current collector. The binder may be a non-water-soluble binder, a water-soluble binder, or a combination thereof.

The non-water-soluble binder may be selected from, for example, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be selected from, for example, a styrene-butadiene rubber, an acrylated styrene-butadiene rubber (SBR), an acrylonitrile-butadiene rubber, acrylic rubber, a butyl rubber, a fluorine rubber, an ethylenepropylene copolymer, polyepichlorohydrine, polyphosphazene, polyacrylonitrile, polystyrene, an ethylene propylenediene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as a negative electrode binder, a cellulose-based compound may be further used to provide viscosity as a thickener. The cellulose-based compound may include one or more of carboxymethyl cellulose, hydroxypropylmethyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative active material.

The conductive material may be included to provide electrode conductivity. A suitable electrically conductive material that does not cause chemical change may be used as the conductive material. Examples of the conductive material include a carbon-based material such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, as examples.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, decanolide, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent includes cyclohexanone, or the like. The alcohol-based solvent include ethyl alcohol, isopropyl alcohol, or the like. Examples of the aprotic solvent include nitriles such as R—CN (where R is a C2 to C20 linear, branched, or cyclic hydrocarbon, and includes a double bond, an aromatic ring, or an ether bond), amides such as dimethylformamide, dioxolanes such as 1,3-dioxolane, sulfolanes, or the like.

The organic solvent may be used singularly or in a mixture. When the organic solvent is used in a mixture, the mixture ratio may be controlled in accordance with a desirable battery performance.

The carbonate-based solvent may include a mixture with a cyclic carbonate and a linear carbonate. The cyclic carbonate and linear carbonate may be mixed together in a volume ratio of about 1:1 to about 1:9. When the mixture is used as an electrolyte, the electrolyte may have enhanced performance.

The organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

[Chemical Formula 1]

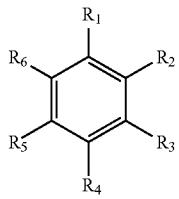

In Chemical Formula 1, $R_1$ to $R_6$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate, an ethylene carbonate-based compound represented by Chemical Formula 2, or propanesultone as an additive for improving a cycle life.

[Chemical Formula 2]

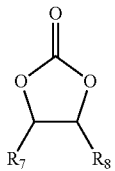

In Chemical Formula 2, $R_7$ and $R_8$ are the same or different and may be independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate range.

The lithium salt dissolved in an organic solvent supplies a battery with lithium ions, basically operates the rechargeable lithium battery, and improves transportation of the lithium ions between positive and negative electrodes. Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiCl_4$, $LiAlO_2$, $LiAlCl_4$, $LiN(C_xF_{2x+1}SO_2)(C_yF_{2y+1}SO_2)$ (where x and y are natural numbers, for example integers of 1 to 20), LiCl, LiI, and $LiB(C_2O_4)_2$ (lithium bis(oxalato) borate; LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
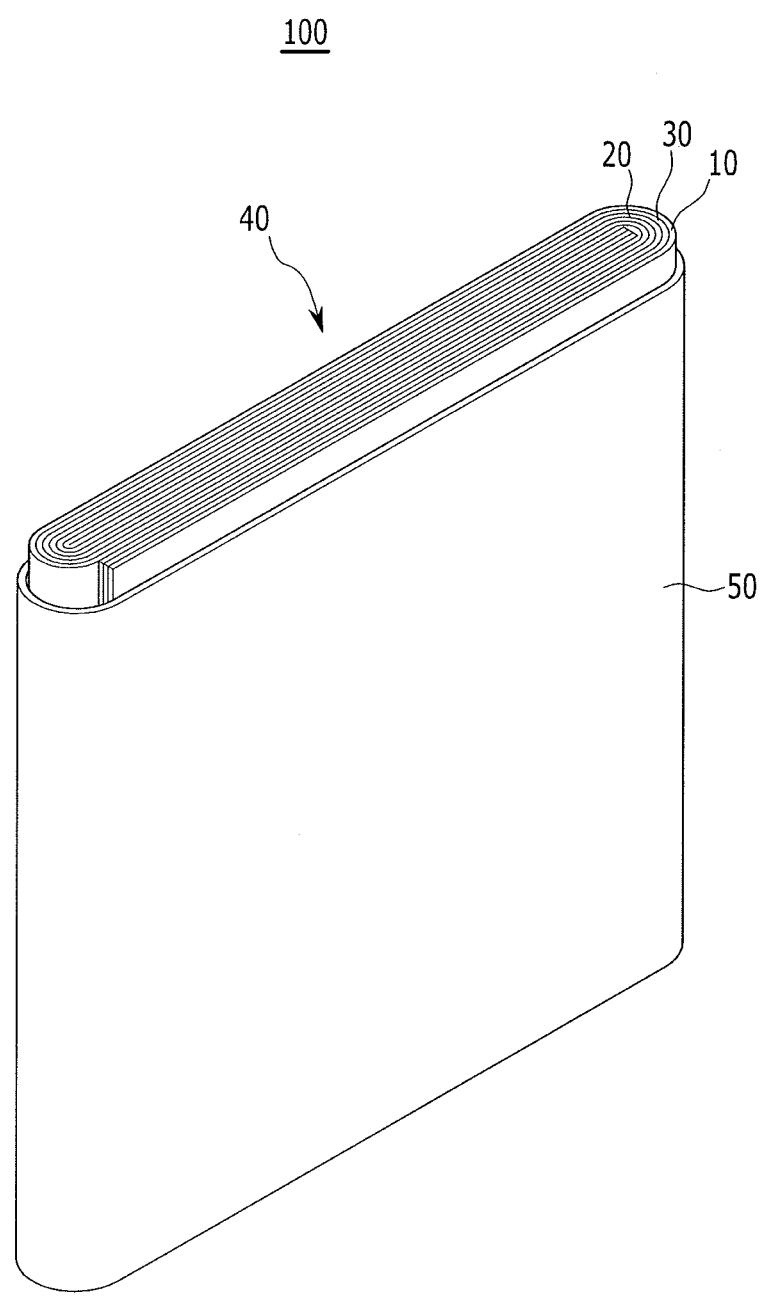
FIG. 2 illustrate a schematic view showing a structure of a rechargeable lithium battery according to an embodiment.

FIG. 2 illustrates an exploded perspective view of a rechargeable lithium battery according to an embodiment. The rechargeable lithium battery according to an embodiment is illustrated as a prismatic battery, as an example. In other implementations, the rechargeable lithium battery may include variously-shaped batteries such as a cylindrical battery, a pouch battery, or the like.

Referring to FIG. 2, a rechargeable lithium battery 100 according to an embodiment includes an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

A coating layer composition was prepared by mixing $Al_2O_3$ ceramic, a polyvinylidene fluoride (Solef 6020, Solvay Chemicals Company) binder having a weight average molecular weight of 700,000, and montmorillonite (Cloisite 15A, average particle diameter (D50): 6 μm) nanoclay modified with a tetravalent ammonium salt having interlayer spacing (d-spacing) of 31.5 Å in an N-methylpyrrolidone solvent. Herein, the ceramic and the binder were mixed in a mixing weight ratio of 95:5. In addition, the ceramic, the binder, and the nanoclay were respectively used in each amount of 94.5 wt %, 5 wt % and 0.5 wt % based on 100 wt % of the entire amount of the ceramic, the binder, and the nanoclay.

The coating layer composition was coated onto the surface of a 10 μm-thick polyethylene polymer substrate and dried to manufacture a separator having a 2 μm-thick coating layer on one surface of the polyethylene polymer substrate.

EXAMPLE 2

A separator was manufactured according to the same method as Example 1 by using the ceramic and the binder in a mixing weight ratio of 95:5 and in addition, using the ceramic, the binder, and the nanoclay in each amount of 94 wt %, 5 wt %, and 1.0 wt % based on the entire weight of 100 wt % of the ceramic. the binder, and the nanoclay.

EXAMPLE 3

A separator was manufactured according to the same method as Example 1 except for using polyvinylidene fluoride having a weight average molecular weight of 1,200,000 (Solef 5130, Solvay Chemicals Company) as a binder.

EXAMPLE 4

A separator was manufactured according to the same method as Example 1 except for using the ceramic and the binder in a mixing weight ratio of 90:10 and in addition, using the ceramic, the binder, and the nanoclay in each amount of 89.5 wt %, 10 wt %, and 0.5 wt % based on 100 wt % of the entire weight of the ceramic, the binder, and the nanoclay.

EXAMPLE 5

A separator was manufactured according to the same method as Example 1 except for using the ceramic and the binder in a mixing weight ratio of 99:1 and using the ceramic, the binder, and the nanoclay in each amount of 98.5 wt %, 1 wt %, and 0.5 wt % based on 100 wt % of the entire weight of the ceramic, the binder, and the nanoclay.

COMPARATIVE EXAMPLE 1

A separator was manufactured by adding 95 wt % of $Al_2O_3$ ceramic and 5 wt % of a polyvinylidene fluoride (Solef 6020, Solvay Chemicals Company) binder having weight average molecular weight of 700,000 to an N-methyl pyrrolidone solvent to prepare a coating layer composition.

COMPARATIVE EXAMPLE 2

A separator was manufactured according to the same method as Example 1 except for using montmorillonite (Cloisite 20A) nanoclay modified with tetravalent ammonium salt having d-spacing of 2.42 Å.

COMPARATIVE EXAMPLE 3

A separator was manufactured according to the same method as Comparative Example 2 except for using polyvinylidene fluoride having a weight average molecular weight of 1,200,000 (Solef 5130, Solvay Chemicals Company) as a binder.

REFERENCE EXAMPLE 1

A separator was manufactured according to the same method as Example 1 except for using the ceramic and the binder in a mixing weight ratio of 95:5 and using the ceramic, the binder, and the nanoclay in each amount of 94.9 wt %, 5 wt %, and 0.1 wt % based on 100 wt % of the entire weight of the ceramic, the binder, and the nanoclay.

Thermal Shrinkage

A length of the separators according to Examples 1 to 5, Comparative Examples 1 to 3, and Reference Example 1 was measured in a machine direction (MD) and in a transverse direction (TD). Subsequently, the separators were respectively allowed to stand at 150° C. for 1 hour, and then, their lengths in the MD and the TD were measured.

A ratio of the lengths before and after allowed to stand at 150° C. was measured, and the results are shown in Table 1.

Tensile Strength

Tensile strength in MD and TD directions of the separators according to Examples 1 to 5, Comparative Examples 1 to 3, and Reference Example 1 was measured, and the results are shown in Table 1. The tensile strength was measured by using the separators to manufacture each specimen having a rectangle size of MD (width) 25 mm×TD (length) 50 mm, mounting the specimens in a universal testing machine (UTM) (used as a tensile tester), adjusting their measuring lengths into 20 mm, and pulling the specimens to obtain an average tensile strength in the MD and the TD.

TABLE 1

| | Kinds and contents of ceramic (wt %) | Kinds and contents of binder (wt %) | Kinds and contents of nanoclay (wt %) | Thermal shrinkage (%) | | Tensile strength (kgf) | |
|---|---|---|---|---|---|---|---|
| | | | | MD | TD | MD | TD |
| Comparative Example 1 | $Al_2O_3$, 95 | Solef 6020, 5 | — | 1.5 | 2.0 | 1320 | 1304 |
| Reference Example 1 | $Al_2O_3$, 94.9 | Solef 6020, 5 | Cloisite 15A, 0.1 | 1.2 | 1.4 | 1354 | 1325 |
| Example 1 | $Al_2O_3$, 94.5 | Solef 6020, 5 | Cloisite 15A, 0.5 | 0.6 | 0.7 | 1435 | 1412 |
| Example 2 | $Al_2O_3$, 94 | Solef 6020, 5 | Cloisite 15A, 1.0 | 0.5 | 0.8 | 1438 | 1410 |
| Example 3 | $Al_2O_3$, 94.5 | Solef 5130, 5 | Cloisite 15A, 0.5 | 0.6 | 0.7 | 1402 | 1390 |
| Example 4 | $Al_2O_3$, 89.5 | Solef 6020, 10 | Cloisite 15A, 0.5 | 0.6 | 0.9 | 1416 | 1394 |
| Example 5 | $Al_2O_3$, 98.5 | Solef 6020, 1 | Cloisite 15A, 0.5 | 0.9 | 1.3 | 1404 | 1380 |
| Comparative Example 2 | $Al_2O_3$, 94.5 | Solef 6020, 5 | Cloisite 20A, 0.5 | 0.8 | 1.0 | 1377 | 1351 |

TABLE 1-continued

| | Kinds and contents of ceramic (wt %) | Kinds and contents of binder (wt %) | Kinds and contents of nanoclay (wt %) | Thermal shrinkage (%) MD | Thermal shrinkage (%) TD | Tensile strength (kgf) MD | Tensile strength (kgf) TD |
|---|---|---|---|---|---|---|---|
| Comparative Example 3 | Al$_2$O$_3$, 94.5 | Solef 5130, 5 | Cloisite 20A, 0.5 | 0.8 | 0.9 | 1350 | 1323 |

In Table 1, the values for each amount of the ceramic, the binder, and the nanoclay are in wt % based on 100 wt % of the entire weight of the ceramic, the binder, and the nanoclay.

As shown in Table 1, the separators respectively having a coating layer using nanoclay having interlayer spacing (d-spacing) of 31.5 Å according to Examples 1 to 5 showed excellent tensile strength compared with the separators respectively having a coating layer using nanoclay having interlayer spacing (d-spacing) of 2.42 Å according to Comparative Examples 2 and 3. In addition, the separators of Examples 1 to 4 showed a low thermal shrinkage ratio compared with the separators of Comparative Examples 1 to 3.

By way of summation and review, a rechargeable lithium battery includes a positive electrode, a negative electrode, and an electrolyte solution. The rechargeable lithium battery may include a separator between the positive electrode and the negative electrode.

The positive electrode may include an oxide including lithium and a transition metal and having a structure capable of intercalating lithium ion such as LiNi$_{1-x}$Co$_x$O$_2$ (0<x<1), and the like, as a positive active material.

The negative electrode may include various carbon-based materials such as artificial graphite, natural graphite, and hard carbon, which intercalate and deintercalate lithium ions, and oxide materials such as a tin oxide, a lithium vanadium-based oxide, and the like, as a negative active material.

The separator may physically separate negative and positive electrodes of a battery and thus may play a role of preventing an electric shut-down and providing a path for ions and simultaneously, applying safety to the battery through the shut down at greater than or equal to a predetermined temperature. It is desirable that a separator secure thermal/mechanical stability of greater than or equal to a predetermined level and show a low shrinkage ratio at a high temperature and also prevent electrodes from being torn apart or broken during the winding and suppress an internal shut-down.

Embodiments provide a separator for a rechargeable lithium battery having improved heat resistance and mechanical stability.

Embodiments provide a rechargeable lithium battery including the separator. The separator may provide improved heat resistance and mechanical stability and overcharge characteristics.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof the present invention as set forth in the following claims.

What is claimed is:

1. A separator for a rechargeable lithium battery, comprising:
   a polymer substrate, and
   a coating layer on at least one surface of the polymer substrate, the coating layer including a ceramic, a binder, and a nanoclay having an interlayer spacing (d-spacing) of about 31.5 Å to about 50 Å.

2. The separator as claimed in claim 1, wherein the nanoclay is present in a form of an exfoliated layered shape in the coating layer.

3. The separator as claimed in claim 1, wherein a content of the nanoclay is about 0.2 wt % to about 5 wt % based on 100 wt % of the coating layer.

4. The separator as claimed in claim 1, wherein a mixing ratio of the ceramic and the binder is about 99:1 weight ratio to about 90:10 weight ratio.

5. The separator as claimed in claim 1, wherein a weight average molecular weight of the binder is 600,000 to about 1,200,000.

6. The separator as claimed in claim 1, wherein the nanoclay is pyrophylite-talc, montmorillonite (MMT), montmorillonite modified with a tetravalent ammonium salt, fluorinehectorite, kaolinite, vermiculite, illite, mica, brittle mica, or a combination thereof.

7. The separator as claimed in claim 1, wherein the ceramic is Al$_2$O$_3$, CaO, MgO, TiO$_2$, ZnO$_2$, SiO$_2$, Al(OH)$_3$, Mg(OH)$_2$, Ti(OH)$_4$, Si(OH)$_4$, or a combination thereof.

8. The separator as claimed in claim 1, wherein the coating layer further includes a conductive material.

9. The separator as claimed in claim 8, wherein the conductive material is Denka black, Ketjen black, Super P, or a combination thereof.

10. The separator as claimed in claim 8, wherein a content of the conductive material is about 0.1 parts by weight to about 5 parts by weight based on 100 parts by weight of the coating layer.

11. A rechargeable lithium battery comprising:
    a positive electrode;
    a negative electrode;
    an electrolyte; and
    a separator as claimed in claim 1 between the positive electrode and the negative electrode.

* * * * *